Oct. 11, 1932. H. M. NACEY 1,881,862
FLOW AND PRESSURE INDICATING MEANS
Filed Jan. 2, 1929 2 Sheets-Sheet 1
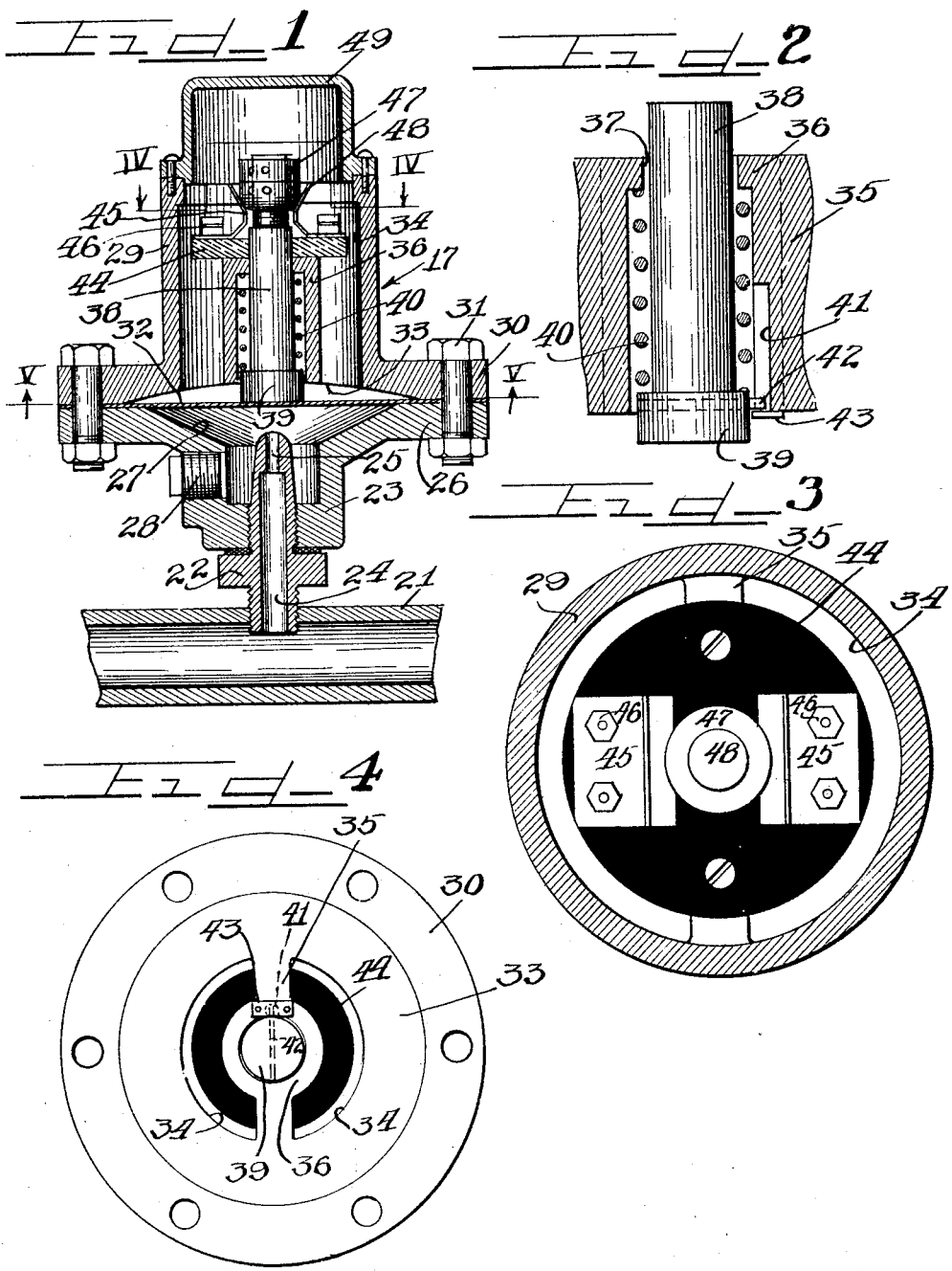

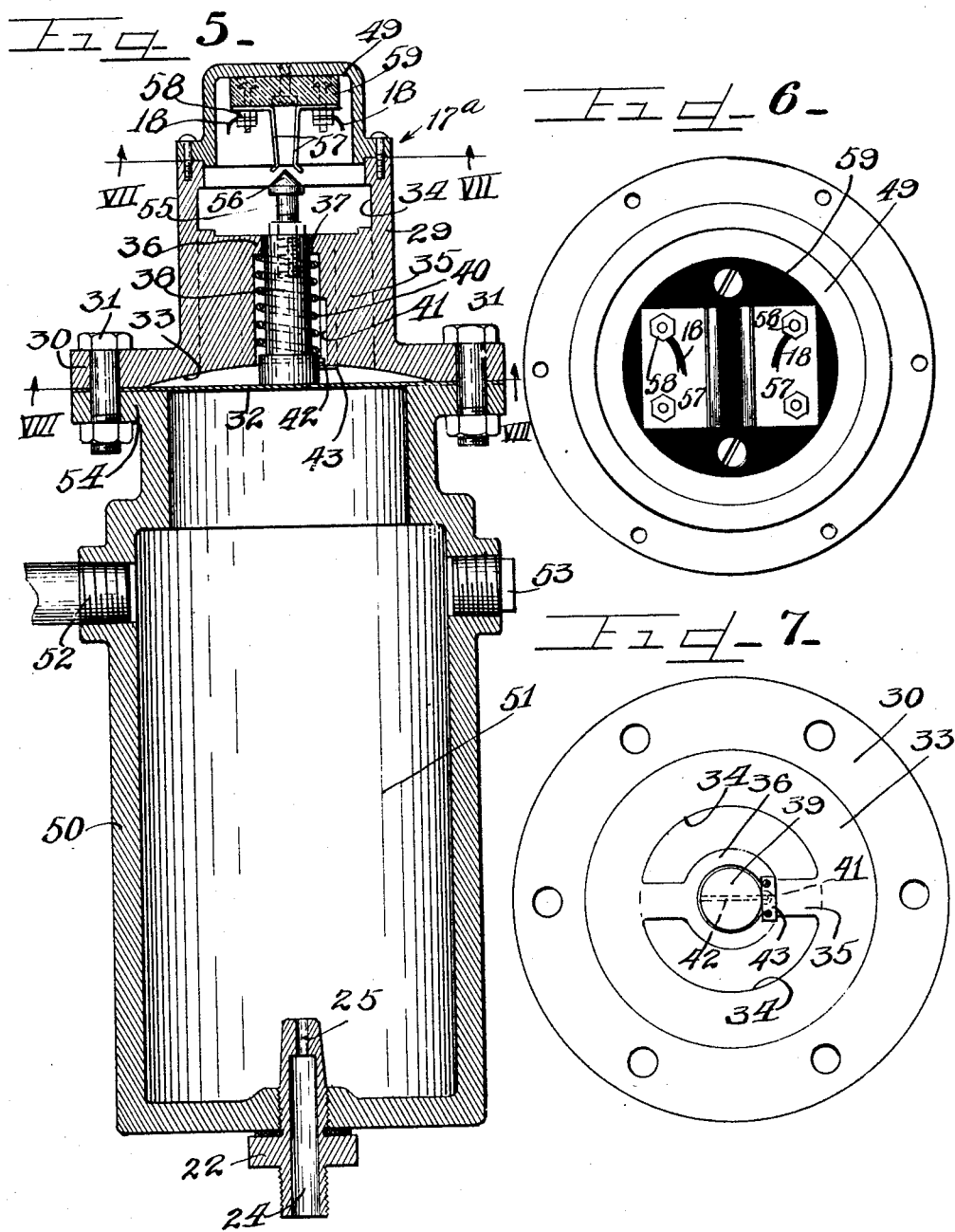

Patented Oct. 11, 1932

1,881,862

UNITED STATES PATENT OFFICE

HARRY M. NACEY, OF CHICAGO, ILLINOIS

FLOW AND PRESSURE INDICATING MEANS

Application filed January 2, 1929. Serial No. 329,909.

This invention relates to flow and pressure indicating means, and more particularly to means for indicating the proximate location of a change in pressure in a piping system containing fluid under pressure, and in the event such piping system is closed, for indicating the location of any flow of fluid from the system, the invention being highly desirable for use in connection with automatic sprinkler systems, although the means herein described may be used for many and various purposes as will be apparent to one skilled in the art.

In piping systems containing a fluid under pressure, be the fluid normally stationary or flowing, it is highly desirable in the event an increase or decrease in pressure occurs in the system to be able to ascertain at a glance at just which point of the system such pressure change first became apparent so that the cause thereof may be immediately determined. This is especially true with regard to automatic sprinkler systems, since such a system frequently extends throughout the greater portion of an entire building, there being branches of the system in each story. If one or more of the sprinkler heads commonly used in such a system should fuse or open either by fire, accident or due to another cause, an immediate notification of the location of the said head would in most instances save considerable property damage. Obviously, it is just as important, if the pressure in such a system is increased or decreased at any particular point, to ascertain immediately the location of such pressure change.

The present invention has therefore been developed to provide means for indicating, preferably at a point remote from the system, the location of a change in pressure in a piping system containing fluid under pressure.

The present invention also seeks the provision of means for indicating at a remote point the location of a flow of fluid from a normally closed piping system.

Another object of the present invention is to provide exceedingly positive and quick acting means for designating the location of a change in pressure within a piping system.

A further object of the present invention is to provide individual means connected in a piping system at various points therealong for altering the electro motive force in an electrical circuit containing indicating means in accordance with variations in pressure occurring within the system, to cause said indicating means to designate the location of such pressure changes.

While some of the more salient features, characteristics and advantages of means embodying this invention have been above pointed out, others will become apparent from the following disclosures.

The invention includes these and other features of construction and combinations of parts hereinafter described, and shown in a preferred form in the drawings, as more particularly indicated by the claim.

On the drawings:

Figure 1 is a central vertical sectional view of an individual portion of the indicating means embodying principles of this invention, showing same connected to a pipe or fluid conduit.

Figure 2 is an enlarged fragmentary view of the central portion of the structure shown in Figure 1.

Figure 3 is an enlarged plan sectional view taken substantially as indicated by line IV—IV of Figure 1.

Figure 4 is an enlarged bottom plan sectional view taken substantially along line V—V of Figure 1.

Figure 5 is a central vertical sectional view similar to Figure 1 showing an individual element of slightly different form mounted on a retarding chamber.

Figure 6 is an enlarged bottom plan sectional view taken substantially along line VII—VII of Figure 5.

Figure 7 is a bottom plan sectional view taken substantially along line VIII—VIII of Figure 5.

As shown on the drawings:

In Figures 1 to 4 inclusive, one of the forms of an element 17 embodying principles of this invention is shown. In this instance the element is mounted on or connected to a pipe 21 which normally contains a fluid under pressure. The element includes a plug 22 having one end thereof threaded into the pipe 21 and the other end threadedly connected to a casing 23, there being a passage 24 through the plug which passage is reduced as at 25 adjacent the upper portion of the plug. The casing 23 has a lower substantially cylindrical portion and then converges outwardly in its upper portion terminating in an annular flange 26, there being a chamber 27 within the casing. An opening is provided in the cylindrical portion of the casing communicating with the chamber 27, which opening may be closed by a plug 28 when so desired. Although the element is shown connected to the pipe line 21 only by means of the plug 22, if circumstances warrant, the pipe 21 may terminate adjacent the plug and a second line which in effect is a continuation of the line 21 may be connected to the casing 23 in lieu of the plug 28. In the latter event, fluid from the pipe 21 would enter the chamber 27 through the plug 22 and be in a position to leave the chamber through the opening normally closed by plug 28, instead of entering the chamber through the plug 22 and resting in a position to leave through the same passage as is the case with a structure as shown in Figure 1.

Mounted on the casing 23 is a second casing 29 having an annular flange 30, the casings being secured together by any desired means or as shown by bolts 31 passing through the flanges of the casing sufficiently tight to properly support a diaphragm 32 therebetween. The diaphragm extends transversely across the interior of the casings and closes the chamber 27, whereby the diaphragm is rendered responsive to pressure changes occurring in the pipe 21. The diaphragm is permitted to move upwardly due to the pressure in the pipe 21 since the casing 29 is provided with an arcuate recess 33 extending outwardly beyond the limits of the chamber 27, the downward motion of the diaphragm below its original position being retarded by that portion of the flange 26 extending inwardly under the recess 33. Since the passage 24 through the plug 22 terminates in a smaller passage 25, the inner end of the plug has the effect of a nozzle and imparts the effect of the pressure directly against the most central portion of the diaphragm whereby the latter is rendered exceedingly rapid in its response to pressure changes.

The casing 29 has therein a chamber 34 which at the lower portion thereof is divided by a partition 35 forming a cylinder 36 having the same axis as the casing 29 and provided with a restricted opening 37 in its upper end. A plunger 38, the upper portion of which extends through the restricted opening 37, reciprocates within the cylinder 36, and is provided with an enlarged lower end 39 held in abutment with a central portion of the diaphragm 32 by a coil spring 40 which surrounds the plunger 38 and has one end thereof in abutment with the enlarged portion 39 and the other end with the top portion of the casing 36. Adjacent the lower portion thereof the cylinder 36 is provided with a relatively narrow longitudinal recess 41 which acts as a guideway for the projecting end of a pin 42 secured in the plunger, the lower end of the recess 41 being closed by a plate 43 secured to the cylinder 36.

Resting on the top of the partition 35 and cylinder 36 and secured thereto in any desired manner is a plate 44 of insulating material upon which is mounted a pair of spaced resilient contacts 45 secured to the plate in any desired manner or by means of terminal posts 46. A pair of conductors leading to an indicator may be connected one to each of the resilient contacts 45, the circuit being closed when the contact knob 47 rests upon the contacts 45 as seen in Figure 1. The knob 47 is mounted upon a post 48 threadedly engaged in the plunger 38, the plunger being preferably formed of insulating material, whereby the post 48 may be screwed in or out of the plunger 38 to permit suitable adjustments of the knob 47. To prevent dust and dirt from entering the element, a cap 49 is tightly secured to the upper end of the casing 29.

The operation of the structure just previously described herein is extremely simple, though none the less positive. Assuming now, for explanatory purposes only, that an open circuit system is desired and that the pipe 21 of Figure 1 is one of the feeders from a sprinkler system, whatever pressure is normally contained within the pipe 21 will be transmitted through the plug 22 to the diaphragm 32. This pressure normally holds the diaphragm elevated from its original position, the diaphragm holding the plunger 38 thereabove keeping the contact knob 47 separated from contacts 45. When a sprinkler head functions there will be a drop in pressure in the pipe 21, permitting the diaphragm to assume substantially its original position carrying the plunger 38 therewith. The contact knob will rest upon contacts 45 and the circuit through the respective indicator will be closed. The circuit may be of any suitable type which when closed will operate the indicator and the same will designate the location of the flow of fluid from the system. Of course, the device will function equally as well whether the piping system is closed or open, since the element is responsive to a change in pressure in the system.

In Figures 5 to 7 inclusive there is shown a slightly different form of the element 17, which for the purpose of convenience has been designated generally as 17a. The element 17a in this instance is mounted upon a casing 50 having a retarding chamber 51 therein normally substantially empty and connected through a conduit 52 for example, to a piping system having a flow therefrom although containing a fluid under pressure, or to a piping system having a restricted or intermittent flow therefrom, as for instance a ported alarm valve. In the bottom thereof the casing 50 is provided with a plug 22 having a relatively large passage 24 therethrough reduced at its upper end as at 25, this plug being identical to that disclosed in Figure 1 for the purpose of convenience and to act as an outlet or drip for the fluid entering the casing through conduit 52. The casing 50 is also provided with an outlet port normally closed by a plug 53, it being understood that a conduit may connect directly with the port closed by plug 53 in which event a closed plug may be substituted for the conduit 52 if so desired. At the upper end thereof the casing 50 is provided with a flange 54 upon which the element 17a is mounted.

The element 17a is in many respects identical with the element 17 described in connection with Figures 1 to 4 inclusive hereinabove, and includes a casing 29 having a flange 30 thereon secured by bolts 31 to the flange 54 of the casing 50, there being a diaphragm 32 tightly held transversely across the top of the casing 50 by the said flanges. The casing 29 has a chamber 34 therein divided at the lower portion thereof by a partition 35 which at its mid portion forms a cylinder 36 having a restricted opening 37 at the top thereof. A plunger 38 having an enlarged end 39 thereon is reciprocative within the cylinder 36, the plunger being normally urged into contact with the diaphragm 32 by coiled spring 40, the casing 29 being arcuately recessed as at 33 in the bottom portion thereof to permit free movements of the diaphragm in an upward direction. The cylinder 36 is also provided with a recess 41 therein to act as a guideway for the projecting end of a pin 42 in the plunger 38, the lower terminus of the recess being closed by a plate 43.

In this instance, however, the circuit controlling structure is somewhat different from the previously described form. Threadedly and adjustably engaged in the plunger 38 is a post 55 having a conical contact nib 56 on the top thereof. The contact nib 56 is in line for closing a circuit through spaced contacts 57 secured by binding posts 58 to a block of insulation material 59 which is in turn secured to a cover 49 on the top of the casing 29. A pair of conductors 18 are connected by binding posts 58 one to each of the contacts 57, these conductors forming a circuit including a suitable indicator.

In operation, the element 17a functions in the same manner as the element 17 previously described herein, with the single exception that as shown in Figure 5 this element is responsive to an increase in pressure for closing the circuit through the respective indicator. The normal flow or leakage through the conduit 52 will pass out of the chamber 51 through the hollow plug 22. In the event a larger flow occurs the plug 22 being smaller than the conduit 52 will not permit the fluid to exit substantially as fast as it enters, and the chamber 51 will fill, thereby exerting pressure on the diaphragm 32, and elevating the nib 56 until it closes the contacts 57 and energizes the respective indicator.

Although both a circuit closing element and a circuit breaking element are shown herein to actuate an indicator, it is to be expressly understood that either element is suitable for the accomplishment of the desired purpose, each element obviously varying the electromotive force in the respective circuit. It is also to be expressly understood that while one element is shown mounted upon a casing 23, and the other upon a casing 50 containing a retarding chamber, both elements are exactly the same in external structure so that they may be interchanged as desired, either element being mountable upon the casing 23 or the casing 50, the use of one element or the other being solely a matter of choice to best fit requirements. For instance, if a closed circuit system is desired, the element 17a may be mounted on the flange 26 on the casing 23 (Figure 1) so that the circuit will be broken when the pressure drops if the element is connected in a normally closed system such as a sprinkler system. Obviously a closed circuit system may likewise be established by mounting the element 17 on the flange 54 of the casing 50. In such a case the circuits through the indicators may be such that the respective indicators will function upon a break in the circuit. It is apparent, then, that the elements may be used in many and varied manners in conjunction with many and varied piping systems.

From the foregoing it will be apparent that I have provided indicating means for designating the location of a pressure increase or decrease within or a flow from a piping system through an indicator being individually connected and actuated by an element disposed at some point in said system. Moreover, the means disclosed and described herein are simple in construction, exceedingly rapid and positive in their action, and they may be installed readily and easily in any piping system already in operation.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

In a flow signal device, a casing having an open ended passage therein and connectable with means containing a fluid under pressure whereby said fluid may enter said passage, a diaphragm blocking said passage and responsive to pressure changes in said fluid, the walls of said casing extending inwardly farther on one side of said diaphragm than on the opposite side thereof, a nozzle in said passage extending into said casing and having a passage therethrough varying in size, said nozzle establishing the connection between said casing and fluid containing means and directing the fluid from said means firstly against the central portion of said diaphragm spaced contacts associated with said casing, and means responsive to movements of said diaphragm for opening and closing a circuit through said contacts.

In testimony whereof I have hereunto subscribed my name at Chicago, Cook County, Illinois.

HARRY M. NACEY.